United States Patent [19]

Lippmann et al.

[11] 3,933,036

[45] Jan. 20, 1976

[54] TREAD-WEAR PREDICTION

[75] Inventors: Seymour A. Lippmann, Huntington Woods; Kenneth L. Oblizajek, Warren, both of Mich.

[73] Assignee: Uniroyal Inc., New York, N.Y.

[22] Filed: Feb. 19, 1974

[21] Appl. No.: 443,595

[52] U.S. Cl. ................................. 73/146
[51] Int. Cl.² ........................................ G01M 17/02
[58] Field of Search .......... 73/146, 8, 432; 33/169 B

[56] References Cited
UNITED STATES PATENTS

| | | | |
|---|---|---|---|
| 3,563,088 | 2/1971 | Sperberg | 73/146 |
| 3,722,270 | 3/1973 | Sperberg | 73/146 |

*Primary Examiner*—Donald O. Woodiel
*Attorney, Agent, or Firm*—Philip, Esq. Sands

[57] ABSTRACT

A method of predicting tread-wear for pneumatic tires, the method incorporating laboratory measurements of pressure and traction data exerted by selected tires against a surface, and the collection of actual treadwear data from road-testing of the tires in order to establish an empirical relationship of certain phenomena which affect tread-wear. The relationship is ultimately reduced to tread-wear predicting equation having parameters which are associated with tabularized numerical values collected from the data in the laboratory and on the tire test-course. The foregoing abstract is neither intended to define the invention disclosed in the specification, nor is it intended to limit the scope of the invention in any way.

6 Claims, 1 Drawing Figure

TREAD-WEAR PREDICTION

BACKGROUND OF THE INVENTION

Although tread-wear is theoretically possible through the transference of a thin surface layer from the tread to the pavement, the consensus of those who have investigated the process is that abrasion is the phenomenon involved. Abrasion partly results from "combing" of asperities in the road surface through the viscous rubber during tread-slippage. This action forms horizontal shear stresses and other stress distributions. When the stresses are sufficiently large, the rubber ruptures, particles are detached from the tread, and abrasion is said to have occurred.

There is evidence that abrasion also originates in fatigue failures of the surface rubber, particularly as affected by oxidative degradation of its component polymer. Here too, the shear and tensile strains at the tread/road interface are controlling factors. Other influences are the interfacial pressure, the tread temperature and the composition of the tread rubber. The interfacial pressures and shear stresses involved in abrasion appear differently on macroscopic and microscopic scales. As may be observed on glass surfaces, there are elastic instabilities which produce variations in shear in the rubber surface from point to point. There are also variations in interfacial pressure. This tendency is aggravated for sliding motions on all kinds of surfaces. Here viscous and inertial phenomena cause elastic waves to develop. High local stresses associated with these waves create elastic instabilities, which in turn lead to minute ruptures or regions of appreciable fatigue. The local ruptures serve as foci for both stress concentrations and slip discontinuities, and the process tends to be self-maintaining.

Stress variations and tearing in rubberlike materials furthermore depend upon dynamic conditions such as slip. Thus, it has been determined that the presence of slip promotes abrasion far beyond that expected from the magnitude of the macroscopic shear stresses alone. Accordingly, the presence of slip is a prerequisite for significant rates of abrasion.

The greater the interfacial pressure and interpenetration of the surfaces, the greater the horizontal stresses have to be for slip at an interface. This leads to the consideration of friction limits of the ratio of horizontal stress to pressure, above which slip takes place and below which it is absent. For the sake of simplicity, the existence of a single-valued effective coefficient of friction indicates the existence of slip. The rate of abrasion as well must bear some relationship to the interfacial pressure during slip. In the expectation that the complexities of the overall analysis will far outweigh minor transgressions in detailed form, the present invention is based upon a simplifying concept. That is, the abrasion rate is proportional to the macroscopic interfacial pressure present during slip.

The influences of tread temperature, road surface texture and tread rubber composition are viewed as conditions which control the viscous drag of road-surface asperities through the tread material and lead to rupture. Furthermore, the tread temperature and rubber composition also determine the rate of creep and deterioration of the tread rubber due to imposed stress concentrations. They also establish the rubber's threshold for microscopic failure. All of these influences are grouped into a single term which is a proportionality factor (a scaling coefficient) for the rate of abrasion. Arguments could be put forth for other kinds of mathematical relationships including interaction terms, etc., but what is used is a first order approximation, the accuracy of which has been tested through experimentation.

The statistical nature of abrasion during the road test is brought into the predictive procedure of treadwear. The conditions at which tires operate, and which affect tread-wear, vary from instant to instant during the road tests. Irregularities in the road surface cause suspension bounce and changes in deflection. Even on straight highways, there is the necessity for corrective steering maneuvers, and there is the normal tendency of vehicles to wander from one side of a lane to the other. In addition, wind drift, path curvature, braking, accelerating, tractive efforts on hills, etc., all affect wear of the tread. The accommodation of all these disturbances is the key to the method described hereinbelow.

SUMMARY OF THE INVENTION

It is therefore an object of the present invention to provide a method by which wear of a free rolling, unsteered, pneumatic tire tread may be predicted for operation on a predetermined test-course.

It is a further object to effect such a prediction by means of an empirically determined relationship of factors which effect tread-wear and which in part are measured in a laboratory and in part are derived from actual road test data.

It is still a further object to provide a new and accurate method to measure actual tread-wear. Accordingly, the principal aspect of the present invention may be characterized as a method of predicting tire tread-wear by rolling speciman tires on laboratory and road surfaces, and measuring various parameters which by their nature have varying effects on tread-wear. Data is then collected and tabularized to permit extraction therefrom of numerical values corresponding to parameters which are related to one another by an empirically determined equation of anticipated tread-wear.

BRIEF DESCRIPTION OF THE DRAWINGS

While the specification concludes with claims particularly pointing out and distinctly claiming the subject matter regarded as the invention herein, it is believed that the invention will be better understood from the following description taken in conjunction with the accompanying drawings, in which:

DETAILED DESCRIPTION OF THE INVENTION

Figure 1:
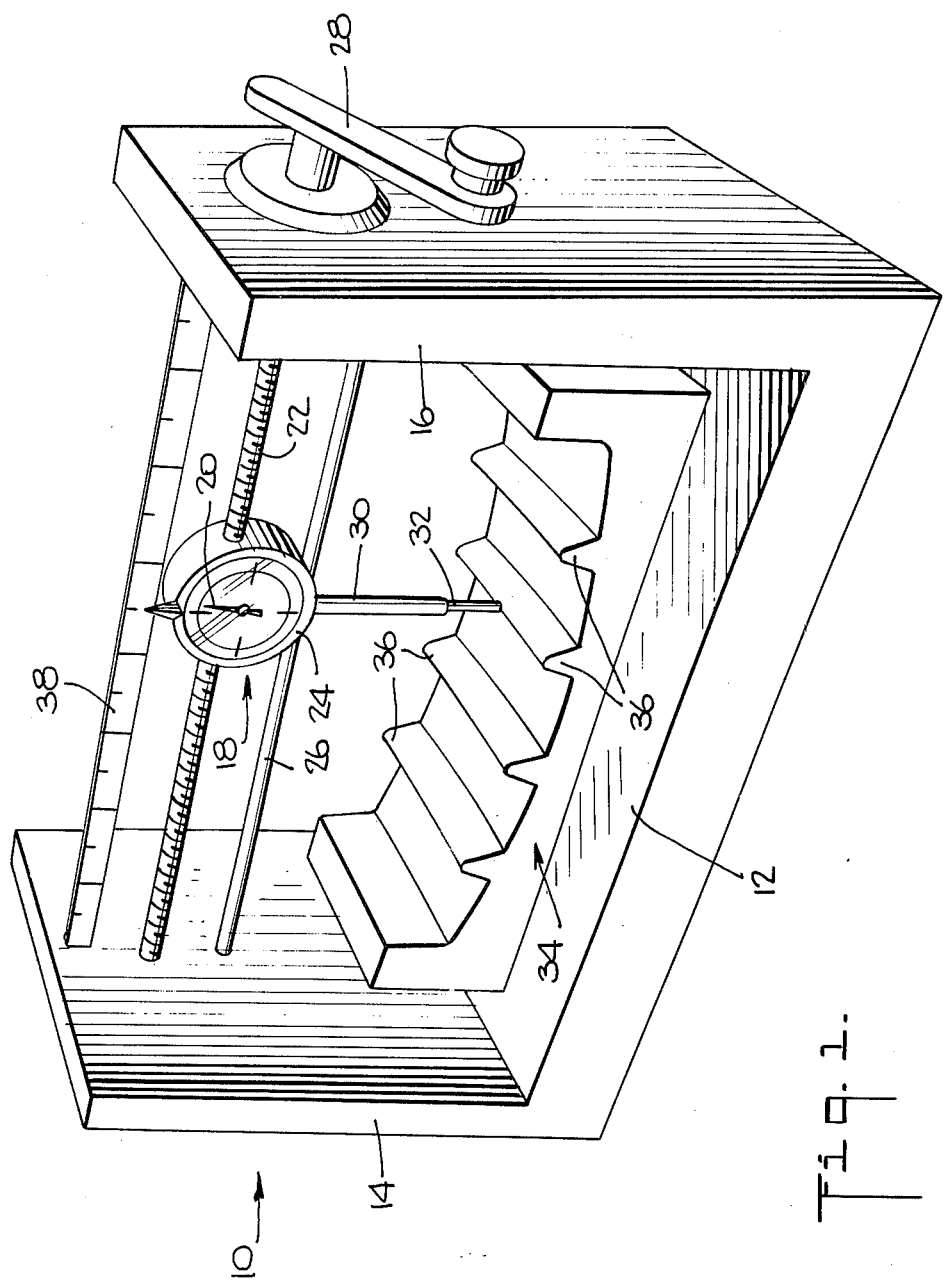
FIG. 1, the sole FIGURE herein, is a perspective view of apparatus for measuring actual tread-wear.

The basis for the mechanics of abrasion during a road test is a free rolling tire at 0° of steer and camber and at normal load. It has been determined that considerable interfacial tractions exist for these conditions. If the road test is of the usual kind, the actual steering angles experienced by the tire are in the order of 1°–2°, and accelerations and braking are generally in the order of a few tenths of a $g$. Therefore, the interfacial stresses of the tread may be treated as though they are primarily that of the free rolling tire but perturbed in some statistical manner. The nature of the perturbation is affected by the vehicle, the driver, the test course, and the road contour, etc. The distributions of the perturbations consequently are controlled by each of these variables, and a defined state of affairs exists only for a specific standardized road test. Consistent with this approach, it is well established that variations in drivers, test courses, speeds, etc., lead to different average levels of treadwear and to differing distributions of wear across the face of the tread.

The following rules emerge empirically for the procedure to predict tread-wear for a standard road test:

a. Wear only occurs when slip is present.

b. Slip is present only when the ratio of horizontal stress to interfacial pressure exceeds a limiting value (the effective coefficient of friction).

c. The wear rate is proportional to the interfacial pressure at the time of slip.

d. The conditions of slip and interfacial pressure during the road test are statistical perturbations of the conditions which exist for the freely rolling tire at zero degrees of steer and camber and at the nominal operating load and deflection.

e. The effects of tread temperature, rubber composition and road surface texture combine to form a coefficient which is proportional to the rate of wear.

An initial or early-stage tread-wear prediction equation (set forth below) has been determined and is conditioned upon the above rules. The equation contains two functions $\phi'$ and $\phi''$ which account for the statistics of perturbations during a road test; a tractive ratio $\tau$ which is the ratio of the amplitude of the horizontal stress vector exerted by the tread against and in the plane of a surface to the interfacial pressure $p$ exerted by the tread normally against that surface; a coefficient $\kappa$ that incorporates tread rubber properties, temperature, and surface texture; and N, the number of laps around the course in a road test. The equation is in the form arrived at for the wear contribution throughout a test at a point X units into the contact patch (footprint or interface) from the entrance end of the patch. The subscript $r$ designates a selected circumferential lateral rib. The equation is as follows:

$$\Delta W_{x,r} = [\kappa N \rho_{x,r} \phi'(\tau_{x,r}) + \kappa N \phi''(\tau_{x,r})] \Delta \chi \ldots \quad (1)$$

wherein $\Delta W_{x,r}$ is an increment of volumetric tread-wear for a selected rib at $\chi$ units into the contact patch.

The distribution functions $\phi'$ and $\phi''$ are too complex in origin to be evaluated from a theoretical analysis and must, therefore, be evaluated in some experimental or empirical manner. These functions summarize the statistical nature of a particular road-test and various consequences that result in the contact patch. K also must be evaluated from empirically derived roadtest data. On the other hand, the interfacial pressures P and the tractive ratios $\tau$ are available from interfacial stress measurements. For example, the interfacial pressures P and the horizontal stresses may be determined in a laboratory by conventional means for various tires. Such conventional means may, for example, be the apparatus as described in copending U.S. patent application No. 424,124, filed on Dec. 12, 1973, the subject matter of which is incorporated herein by reference. It appears then that if the distribution functions relating wear to the tractive ratios are once established, then further experimental evaluations of tire interfaces will more definitively lead to wear prediction.

In order to test for the distribution functions $\phi'$ and $\phi''$, it is necessary to first sum equation (1) for the contributions of wear over increments of X for each of the ribs $r$. This could be accomplished by integrating along the rib location X. However, an approximating shortcut is to consider and sum up only three representative tread-wear regions in the contact patch for each rib. These may respectively be the point at which the fore and aft traction substantially attains a forward maximum, the center of contact patch and the point at which the fore and aft traction is substantially at a rearward maximum. The first and last of the points capture the character of the regions in which slip is generally most prevalent. The midpoint has been determined as being less contributory to wear than the others, but nevertheless may be included.

It has been further determined that the magnitude of the function $\phi''$ is small compared to $\phi'$, thus functions $\phi'$ and $\phi''$ may be grouped into a single statistical distribution function $\phi$. Thus, equation (1) may be restated as follows:

$$W_r = \rho_{r,exit} \cdot \phi(\tau_{r,exit}) \ldots \quad (2)$$

wherein, $\rho_{r,exit}$ = the interfacial pressure measured in a laboratory at the exit end of the contact patch for a designated rib $r$, $\phi(\tau_{R, exit})$ = a statistical distribution function describing the prevalence of a slip as it depends on perturbations and on the measured tractive ratio $\tau_{r,exit}$, also at the exit end of the contact patch, for the designated rib $r$ of a freely rolling tire, and $W_r$ = tread-wear of the designated rib $r$.

The basis for simply using the measurements of the interfacial pressure and stress at the exit end of the contact patch is that at that point slip, and thus wear, is most prevelant and greatest. What is meant by "exit end" of the contact patch is the first point beyond the center of the contact patch in the fore and aft direction at which a representative value of a change in fore and aft traction approaches zero, and substantially any point therefrom to the actual exit end of the contact patch.

Accordingly equation (2) may be utilized as a basis for predicting tread-wear by rolling a number of tires on a laboratory surface and measuring the interfacial pressures and stresses thereof at the exit end of the contact patch for a designated rib. Tractive ratios can thereby be determined and tabularized. Thereafter actual tread-wear measurements may be effected on a test course. With the actual measurements of wear and values for interfacial pressure and tractive ratios known, equation (2) can be solved for determining values of the function $\phi$. These values may then be tabularized opposite their corresponding tractive ratio values. Then, if a tire is subsequently selected to predict the projected tread-wear thereof, its tractive ratio and pressure can be determined likewise in a laboratory, and that value can be used to enter the table of values for $\tau$ to permit selection of a corresponding value for $\phi$. The value for the function $\phi$ can then be extracted from the tabularized data, and along with the corresponding value for the pressure, it can be substituted in equation (2). The actual tread-wear $W_r$ of a designated tread rib can thereby be solved for.

It will be understood that equation (2) is not mathematically derived from equation (1), but is, on the other hand, an approximating equation of tread-wear determined from empirical study, the specific methodology of which study does not directly form the basis of the present invention.

It has also been empirically determined that in order to utilize equation (2) effectively, all tires selected should preferably have the same, or substantially the same, "cornering coefficient" $\theta$. The cornering coefficient for a rolling tire is a ratio of the change of gross side-force of tire-against-axle, conventionally referred to as the lateral force, to the corresponding change of an angle formed by the rotation of the wheel and tire assembly about an axis passing through the wheel's rotational center and extending perpendicular to the road plane, the magnitude of this angle being defined by the relative angular orientation of the wheel plane with respect to the actual direction of travel, this ratio finally being divided by the load born by the tire. The change in side force is determined by steering the tire in an additional step of rolling at a steering angle slightly different from zero degrees, this giving rise to what is conventionally understood to be a "slip angle", allowing the tire to attain a state of equilibrium conventionally termed as a steady state, and determining the value of the cornering coefficient $\theta$ near the zero slip angle.

A more detailed analysis of "slip angle" and related tire characteristics is discussed in Society of Automotive Engineers paper No. 794C, in an article entitled "Structural Mechanisms of Tires Leading to the Development of Steering Forces", by Seymour A. Lippman, the paper given to the Automotive Engineering Congress, Detroit, Mich., Jan. 13–17, 1964. The subject matter of this paper is incorporated herein by reference.

With regard to the measurement of actual tread-wear, it is conventional for wear to be measured at the grooves of the tires. The depth from the surface of a rib to the bottom of the adjacent grooves is an indication of the remaining antiskid capacity of a tire at that location. Along with initial measurements on an unworn tire, the groove depth represents the degree of wear near the groove. However convenient this procedure may be it has not been found unsatisfactory. Interfacial measurements of stress across the face of a rib show that conditions near the grooves are usually not representative of the remainder of the rib. As might be expected, detailed measurements of wear also show significant variations across the rib. The difficulty is compounded further when the measure of wear is with a conventional cross-bar depth gage detecting the difference in length between the bottom of the grooves and the location of the cross bar.

These errors of measurement may be circumvented by obtaining plaster castings of the treads of inflated tires in the new and worn states. The castings are mounted on a bed plate so that they may be explored with a dial gage having, for example, a 0.01 inch round foot or plunger and a digitized contour is developed. The wear across the tread established in this way also features a continuous measurement across each rib. The groove bases act as reference points in the unworn and worn states. These points locate a base level curve for calculating the wear profile of the tire.

The apparatus for effecting actual tread-wear is illustrated in FIG. 1 and is denoted generally by the reference character 10. The apparatus 10 includes a bed plate 12 and a pair of upstanding side walls 14,16. A gage 18 having a rotary indicator 20 is shiftably mounted threadedly on a rotary worm 22 and is guided at the lower dial portion 24 thereof, in an upright condition, by means of a rod 26. The lower dial portion 24 may for example have a cut-out (not shown) for embracing the rod 26 loosely. The worm 22 can be turned to effect shifting of the gage 18 by means of an accessible rotary handle 28 fixedly secured to one end of the worm 22.

The gage 18 is furthermore provided with a tabular member 30 in which is endwise shiftable a spring-actuated plunger 32 which is, in a conventional manner, operatively associated with the rotary indicator 20 to effect turning of the latter when the plunger 32 is shifted upwardly or downwardly relative to the tubular member 30.

When a plaster casting is formed to provide an imprint of a portion of a tread, the casting displays raised casting ribs which constitute that portion of the plaster which during formation of the casting penetrated the tread-grooves between neighboring tread-ribs.

Thus, castings can be made of tires first in a new or unworn condition, and then in a worn condition. A casting, for example that denoted by reference character 34 in FIG. 1, may then be disposed upon the bed plate 12 between the side walls 14,16. The casting ribs 36 are thereby confronted by the plunger 32 and may be engaged by the latter.

In order to effect measurement of the tread-wear, the casting 34 is made from an unworn or new tread. The gage 18 is then shifted by turning the handle 28, and the plunger slides from an initial reference position at the apex of a selected one of the casting ribs 36 downwardly along the casting. The rotary indicator 20 thereby displays depth changes which can be recorded. The exact position of the gage 18 may be determined by a scale 38 extending across the bed plate 12 between the sidewalls 14,16. This procedure is then repeated using a casting made from the same tread after the latter is worn. Comparisons can then be made which give rise to actual tread wear.

It should also be emphasized that as the tread wear of a tire progresses, the distribution of interfacial tractions and pressures may change as a consequence of the loss of tread rubber. This altering of the system leads to modifications in the distribution of wear rates across the tire. As a result, it is only possible in general to predict the wear profile which will occur for the next moderate amount of road testing following the interfacial measurements. Desirable tire designs, however, maintain a constant wear profile and may be evaluated initially for a considerable portion of the tread life.

In summary, the predictive equation (2) was developed for a specific wear testing procedure by using the form of equation (1), by employing the plaster casting technique for evaluating the wear profile across the face of the tire, and by sampling the interfacial force values at the points along the contact length of each lateral rib location. A variety of tire designs and numerous states of wear were involved in the data set. This effort at correlation leads empirically to the following further approximating equation:

$$W_r = k_1 \cdot P_{r,\text{exit}} \cdot \left( \frac{H_{r,\text{exit}}}{P_{r,\text{exit}}} - k_2 \right) \quad (3)$$

wherein $H_{r,exit}$ = the tractive stress exerted by the tread against a laboratory surface in the plane of the latter and at the exit end of the contact patch, and $\kappa_1$ & $\kappa_2$ = coefficients.

The coefficients $\kappa_1$ and $\kappa_2$ may be determined, for example, by a conventional procedure known as "multiple linear regression analysis" and described in such books as *Mathematical Handbook for Scientists and Engineers*, Korn and Korn, McGraw Hill, 1961, pages 547 etc., and *Theory and Problems of Statistics*, Spiegel, M. R. Schaum Pub. Co., 1961, pages 269 etc., the subject matter of each of which is incorporated herein by reference.

Alternatively, the coefficients $\kappa_1$ and $\kappa_2$ may be determined by plotting a graph from the tabularized data associated with equation (2) of the function $\phi(\tau_{r,exit})$ along a vertical axis and of the tractive ratio $\tau_{r,exit}$ along a horizontal axis. The slope of the line established by the latter graph constitutes the value for $\kappa_1$, whereas the $\tau_r$, exit intercept constitutes the value for $\kappa_2$.

With the value for $p_r$, exit determined for a tire whose tread-wear is to be predicted, as well as the value for $H_r$,exit, $W_r$ of equation (3) can be solved for, thereby, giving rise to the prediction of tread-wear of a designated rib r of the selected tire.

In order to predict tread-wear of tires having different cornering coefficients $\theta$, equation (3) may be modified as follows:

$$Wr = k_1 \cdot Pr\text{,exit} \cdot \left( \frac{Hr\text{,exit}}{Pr\text{,exit}} - k_2 \right) \cdot (k_3\theta + k_4) \qquad (4)$$

Upon determining average values for the coefficients $\kappa_1$ and $\kappa_2$, respectively, for many tires having different cornering coefficients $\theta$, and the actual rate of tread-wear for each of the tires, a graph may be plotted using the rate of average tread-wear for all of the ribs as the vertical axis and the different values for $\theta$ as the horizontal axis. A line, thus formed, gives rise to the values of $\kappa_3$ & $\kappa_4$, $\kappa_3$ being the slope of the line and $\kappa_4$ the average tread-wear intercept. The average values for $\kappa_1$ and $\kappa_2$ may then be used in equation (4), as well as the values for $\kappa_3$ and $\kappa_4$ graphically determined.

To predict tread-wear of any tire, simply then requires one to measure that tire's cornering coefficient, as well as the values of $H_r$,exit and $p_r$,exit for that tire. Equation (4) can then be solved to determine the anticipated tread-wear of a designated rib r of that tire.

Equation (4) has been determined to be quite accurate, but there are certain deviations in prediction of tread-wear from actual wear measured. It has been determined that there are interactions between various events at the exit end of the contact patch. These interactions take one of several forms depending on the conditions in the zone of slip. One rib which might not slip of its own accord can be caused to slip as a result of stresses and displacements transferred to it from a nearby rib. Retardations of slip due to adjacent conditions are also possible. In any event, the residual errors in the predictive equation (4) are consistent with interactions between adjacent ribs and are largely accounted for by equations corresponding to:

$$Wr = k_1 \cdot Pr\text{,exit} \cdot (k_3\theta + k_4) \cdot \left\{ \left( \frac{Hr\text{,exit}}{Pr\text{,exit}} - k_2 \right) + \beta\left( \Delta \frac{H}{P} \right) \right\} \qquad (5)$$

The function $\beta(\Delta H/\rho)$ accounts for the interactions from adjoining ribs and depends on the tractive ratios that occur at these locations. The quantity $\Delta H/\rho$ is defined in three ranges as follows:

1. Where the rib in question is interior to the tread (surrounded on both sides by neighboring ribs, $$\Delta_1 \left( \frac{H}{P} \right) = \frac{Hr\text{,exit}}{Pr\text{,exit}} - \frac{1}{2}\left( \frac{Hr+1\text{,-exit}}{Pr+1\text{,exit}} + \frac{Hr-1\text{,exit}}{Pr-1\text{,exit}} \right) \qquad (6)$$

2. Where the rib in question is the left hand outer rib, $$\Delta_2 \left( \frac{H}{P} \right) = \frac{Hr\text{,exit}}{Pr\text{,exit}} - \frac{Hr+1\text{,-exit}}{Pr+1\text{,-exit}} \qquad (7)$$

3. Where the rib in question is the right hand outer rib, $$\Delta_3 \left( \frac{H}{P} \right) = \frac{Hr\text{,exit}}{Pr\text{,exit}} - \frac{Hr-1\text{,-exit}}{Pr-1\text{,-exit}} \qquad (8)$$

The variable $\Delta H/\rho$ is therefore the difference in tractive ratios at the exit end of the contact patch between the rib for which calculation is being performed and the net ratios of its surrounding local environment.

Equation (5) may be utilized to establish interaction effects by substituting for $W_r$ the amount of tread-wear, actually measured and determined for each tire, and solving for numerical values of $\beta(\Delta H/\rho)$ for each tread rib. Then, by utilizing equations (6), (7) and (8) via actual measurements of the appropriate tractive ratios $H/\rho$ or $\tau$, numerical values of the respective values for $\Delta H/\rho$ may be determined.

The values for $\Delta H/\rho$ may then be tabularized opposite corresponding values determined for the function $\beta(\Delta H/\rho)$ from equation (5). Then, by selecting a tire whose tread-wear is to be predicted, for a designated rib r, and using the values of the tractive ratios for the rib r as well as those for adjacent ribs, e.g. r−1 (a left-hand adjacent rib) and R+1 (a right-hand adjacent rib), its value of $\Delta H/\rho$ can be measured.

With its value of $\Delta H/\rho$ determined, a corresponding numerical value for $\beta(\Delta H/\rho)$ can be extracted from the tabularized data and used in equation (5). The tire's value of $\theta$ can likewise be determined and used in equation (5). The average values for the coefficients $\kappa_1$ and $\kappa_2$ have already been determined, as well as the values for the coefficients $\kappa_3$ and $\kappa_4$. Equation (5) can then be solved for $W_r$.

It will be understood that the foregoing description of a preferred embodiment of the present invention is for purposes of illustration only, and that the various structural and operational features and relationships herein disclosed are susceptible to a number of modifications and changes none of which entails any departure from the spirit and scope of the present invention as defined in the hereto appended claims.

What is claimed is:

1. A method of predicting tire tread-wear, comprising the steps of:
   a. rolling a specimen tire freely upon a laboratory surface at substantially zero degrees of steer and camber;

b. measuring pressure exerted by a selected circumferential rib of said tire normally against said surface at substantially an exit end portion of the tread/surface interface;

c. measuring traction in terms of force/unit area exerted by said selected rib against said surface in a plane of said tread/surface interface and substantially at said exit end portion;

d. repeating steps (a) through (c) for additional specimen tires;

e. measuring the actual amount of tread-wear resulting from rolling each of said tires a selected distance over a test-course surface;

f. substituting the data collected for each said tire from steps (a) through (e) in an equation corresponding to:
$$W_r = P_{r,exit} \cdot \phi(\tau_{r,exit}),$$
wherein $W_r$ = tread-wear data collected from step (e),
$P_r$, exit = pressure data collected from step (b),
$\phi(\tau_{r,exit})$ = a statistical distribution function incorporating the prevalence of tread-slip on the test-course surface,
$\tau_{r,exit}$ = the tractive ratio of the data collected in step (c) to the data collected in step (b),
$r$ = said selected tread-rib, and "exit" = the designation for said exit end portion of said tread/surface interface;

g. determining numerical values of the function $\phi(\tau_{r,exit})$ from step (f) for each corresponding rib of each said tire;

h. tabularizing each value determined in step (g) opposite its corresponding tractive ratio constituted by respective ratios of the values measured in step (c) to the values measured in step (b);

i. selecting at least one additional tire whose tread-wear is to be predicted;

j. performing steps (a) through (c) for the selected tire of step (i);

k. selecting a numerical value from the tabularized data of step (h) of the function $\phi(\tau_{r,exit})$ corresponding to the tractive ratio of the latter said tire as determined from the data collected from step (j); and l. substituting the numerical value for $\phi(\tau_{r,exit})$ determined in step (k) and the pressure value determined in step (j) in an equation corresponding to the equation recited in step (f) to determine anticipated tread-wear of the designated rib r of the selected tire of step (i); said step (e) comprising:

forming a plaster casting of a portion of each tread of said steps (a) and (d) in both a new and worn condition, the plaster during the formation of the castings penetrating the tread-grooves between neighboring circumferential tread-ribs and thereby presenting raised casting ribs;

measuring the depth of each of the corresponding new and worn-condition tread castings from reference points constituted of the respective raised casting ribs; and comparing the relative depths of the corresponding castings to determine actual tread-wear.

2. A method as claimed in claim 1, including selecting the tires of said steps (a) and (d) from a group wherein all tires of the group have substantially the same cornering coefficient $\theta$, said coefficient being a ratio of the change in gross side-force exerted by each tire against the axle supporting it, divided by the weight born by that tire, to the change in slip angle of that tire, the latter said force and slip angle being determined by steering said tires in an additional step of rolling at a steering angle slightly different from zero degrees.

3. A method as claimed in claim 2, including omitting said steps (k) and (l), and performing each of said steps (a) through (j) with the exception that for the equation recited in said step (f) substitute the following equation:

$$W_r = k_1 \cdot P_{r,exit} \cdot \left( \frac{H_{r,exit}}{P_{r,exit}} - k_2 \right), \text{wherein}$$

wherein $W_r$ = tread-wear data collected from said step (e),
$P_{r,exit}$ = pressure data collected from said step (b),
$H_{r,exit}$ = traction data collected from said step (c), and
$k_1$ and $k_2$ = coefficients determined by: (3a) from the data tabularized in said step (h) plotting a graph of said $\phi(\tau_{r,exit})$ function along a vertical axis and of said tractive ratio $\tau_r$,exit along a horizontal axis, (3b) utilizing the slope of a line formed from said graph as said coefficient $k_1$, and (3c) utilizing the $\tau_r$,exit intercept as said $k_2$ coefficient, and further including substituting the numerical values determined for the coefficients and parameters in the last said equation to determine anticipated tread-wear of the designated rib r of the selected tire of said step (i).

4. A method as claimed in claim 3, including modifying the last said equation by multiplying the right-hand side of the last said equation by the bracketed terms ($k_3 \theta + k_4$), selecting further specimen tires each having a different cornering coefficient $\theta$, determining the numerical value of said coefficients $k_1$ and $k_2$ for the last said further specimen tires by said steps (3a) through (3c), determining an average value of said coefficient $k_1$ and $k_2$ for all tires selected, plotting a graph of all determined values of the cornering coefficients $\theta$ along a horizontal axis and of the rate of average tread-wear of all the ribs of all tires selected along a vertical axis, utilizing the slope of a line formed from the last said graph as the value for the coefficient $k_3$, utilizing the tread-wear intercept as the value for the coefficient $k_4$, and utilizing the determined average values of said coefficients $k_1$ and $k_2$ for the latter respectively to solve the modified equation for $W_r$.

5. A method as claimed in claim 4, including introducing a function $\beta(\Delta H/\rho)$ into the last said modified equation such that the latter is further modified as follows:

$$W_r = k_1 \cdot P_{r,exit} \cdot (k_3\theta + k_4) \cdot \left\{ \left( \frac{H_{r,exit}}{P_{r,exit}} - k_2 \right) + \beta\left( \Delta \frac{H}{P} \right) \right\},$$

said function $\beta(\Delta H/\rho)$ accounting for interactions of adjacent ones of the circumferential tread-ribs, the parameter $\Delta H/\rho$ of the last said function having one of three forms and being dependent upon which rib is selected as follows:

$$\Delta_1 \left( \frac{H}{P} \right) = \frac{H_{r,exit}}{P_{r,exit}} - \frac{1}{2}\left( \frac{H_{r+1,exit}}{P_{r+1,exit}} + \frac{H_{r-1,exit}}{P_{r-1,exit}} \right),$$

for an interior rib $r$;

$$\Delta_2\left(\frac{H}{P}\right) = \frac{H_{r,exit}}{P_{r,exit}} - \frac{H_{r+1,exit}}{P_{r+1,exit}},$$

for a left-hand outer rib $r$; and $$\Delta_3\left(\frac{H}{P}\right) = \frac{H_{r,exit}}{P_{r,exit}} - \frac{H_{r-1,exit}}{P_{r-1,exit}},$$

for a right-hand outer rib $r$, and further including:

5a. utilizing the actual tread-wear data determined in said step (e) for each tire selected, solving the last said further modified equation for the numerical value of the function $\beta(\Delta H/\rho)$ for each tread-rib;

5b. utilizing the relationships for $\Delta_1(H/\rho)$, $\Delta_2(H/\rho)$ and $\Delta_3(H/\rho)$, determining the numerical values of the latter;

5c. tabularizing the numerical values determined in said step (5a) opposite corresponding values determined in said step (5b);

5d. for said tire of said step (i), determining the value of $\Delta H/\rho$ for a selected one of its ribs;

5e. from the tabularized data of said step (5c), selecting a value for the function $\beta(\Delta H/\rho)$ which corresponds to the value of $\Delta H/\rho$ determined in said step (5d); and 5f. substituting the value determined in said step (5e) into the last said further modified equation together with the numerical values for the remaining coefficients and parameters already determined to determine anticipated tread-wear of the rib selected in said step (5d).

6. A method of measuring actual tread-wear of a pneumatic tire, comprising:

6a. forming a plaster casting of a portion of a tread in both a new and worn condition, the plaster during formation of the castings penetrating the tread-grooves between neighboring circumferential tread-ribs and thereby presenting raised casting ribs;

6b. measuring the depth of each of the corresponding new and worn-condition tread castings from reference points constituted of the respective raised casting ribs; and 6c. comparing the relative depths of the corresponding castings to determine actual tread-wear.

* * * * *